United States Patent [19]

Kako

[11] Patent Number: 5,368,005
[45] Date of Patent: Nov. 29, 1994

[54] APPARATUS FOR DETECTING FAULT IN EXHAUST GAS RECIRCULATION CONTROL SYSTEM OF INTERNAL COMBUSTION ENGINE

[75] Inventor: Hajime Kako, Himeji, Japan

[73] Assignee: Mitsubishi Denki Kabushiki Kaisha, Tokyo, Japan

[21] Appl. No.: 153,167

[22] Filed: Nov. 17, 1993

[30] Foreign Application Priority Data

Nov. 19, 1992 [JP] Japan .................... 4-310351

[51] Int. Cl.$^5$ ............................. F02M 25/07
[52] U.S. Cl. ........................ 123/571; 73/117.3
[58] Field of Search ......... 123/676, 571; 73/117.3, 73/118.2; 364/431.06

[56] References Cited

U.S. PATENT DOCUMENTS

| | | | |
|---|---|---|---|
| 4,715,348 | 12/1987 | Kobayashi et al. | 123/571 |
| 4,825,841 | 5/1989 | Norota et al. | 123/571 |
| 5,137,004 | 8/1992 | Takahata et al. | 123/571 |
| 5,154,156 | 10/1992 | Ohuchi | 123/571 |
| 5,251,599 | 10/1993 | Ohuchi et al. | 123/571 X |
| 5,257,610 | 11/1993 | Ohuchi | 123/571 |

FOREIGN PATENT DOCUMENTS 0111274 5/1988 Japan .
2-9937 1/1990 Japan .

Primary Examiner—Willis R. Wolfe
Attorney, Agent, or Firm—Sughrue, Mion, Zinn, Macpeak & Seas

[57] ABSTRACT

An apparatus detects occurrence of a fault in an exhaust gas recirculation (EGR) control system of an internal combustion engine. An intake air amount is changed by a predetermined quantity, which is determined in dependence on an operation state of the engine, when an EGR control valve is temporarily opened or closed. A determination is made as to whether a pressure within an intake pipe of the engine has changed after opening or closing of the EGR control valve. On the basis of the result of the above determination, occurrence of a fault in the EGR control system is determined. Regardless of resolution of an A/D converter which is employed in the EGR control system for performing A/D conversion of an analog signal indicative of a sensed intake air pressure, a fault thereof can be detected with high accuracy.

5 Claims, 9 Drawing Sheets

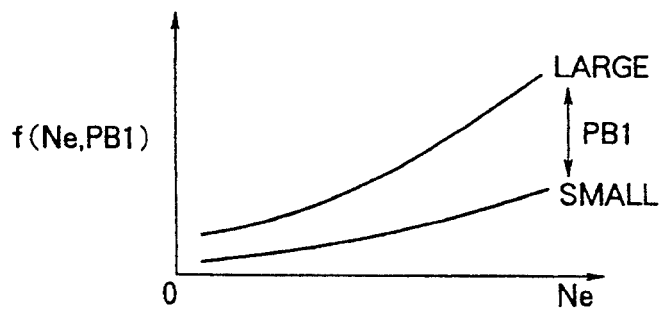
FIG. 4
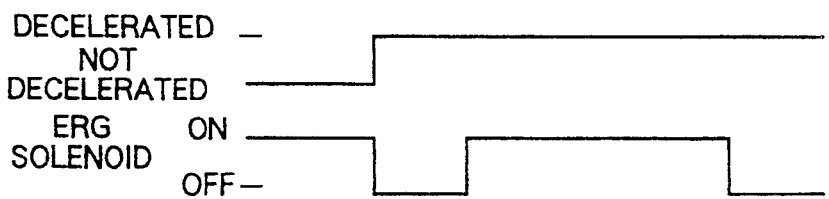
FIG. 5(a)
FIG. 5(b)
FIG. 5(c)
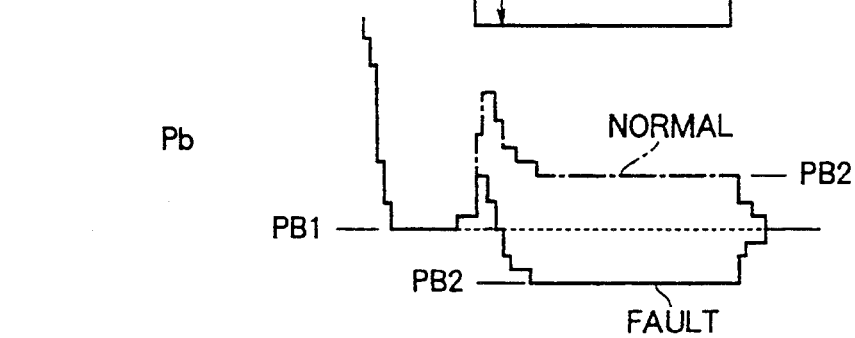
FIG. 5(d)

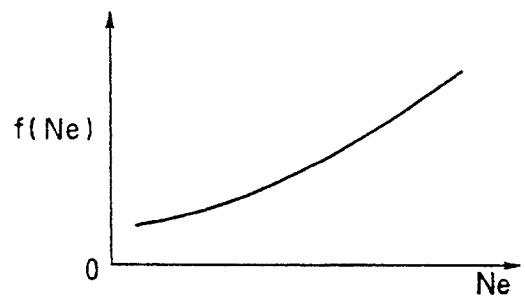

APPARATUS FOR DETECTING FAULT IN EXHAUST GAS RECIRCULATION CONTROL SYSTEM OF INTERNAL COMBUSTION ENGINE

BACKGROUND OF THE INVENTION

1. Field of the Invention

The present invention relates to an apparatus for detecting a fault in an exhaust gas recirculation (EGR in abbreviation) control system of an internal combustion engine for recirculating a part of exhaust gas of the engine to an intake pipe thereof.

2. Description of the Related Art

The EGR control systems of the type mentioned above are heretofore employed widely in the internal combustion engines for the purpose of reducing $NO_x$ content in the exhaust gas of the engine. As a typical one of such systems, there may be mentioned an EGR control system of exhaust gas pressure control type in which an exhaust gas pressure transducer is used. With this system, the amount of the exhaust gas to be recirculated is so controlled that the ratio of the exhaust gas contained in the intake air flow remains substantially constant.

In this conjuncture, an apparatus for detecting occurrence of abnormality or a fault in the EGR control system is also known, as is disclosed, for example, in Japanese Unexamined Patent Application Publication No. 9937/1990 (JP-A-2-9937). According to this known technique, an exhaust gas recirculation (EGR) control valve is installed in an EGR passage through which an exhaust pipe of the engine is communicated to an intake pipe. The EGR control valve is temporarily operated (e.g. closed and opened) during deceleration of the engine, wherein it is detected whether or not a change in the pressure within the intake pipe brought about by the operation of the EGR control valve remains within a predetermined range. On the basis of the result of this decision, it is determined whether the EGR control system suffers from a fault.

The principle of the fault detecting apparatus described above is based on the fact that a change in the pressure within the intake pipe necessarily occur when the EGR control valve is actually operated. Starting from this fact, a negative pressure for actuating the EGR control valve is changed over for determining whether the change in the pressure within the intake pipe occurs due to the change-over of the negative pressure, to thereby diagnose the EGR control valve as well as peripheral devices thereof as to occurrence of the fault.

The fault detecting apparatus for the EGR control system described above has a problem in the application to the diagnosis of the EGR control system of the exhaust gas pressure control type in which an exhaust gas pressure transducer is employed and the amount of exhaust gas to be recirculated is so regulated that the exhaus gas content of the intake air flow remains at a substantially constant ratio, because a change in the pressure within the intake pipe is very small when the EGR control valve is operated during deceleration of the engine. Such being the circumstances, it becomes difficult or impossible in an extreme case to detect with reasonable accuracy whether the change of the pressure within the intake pipe lies within a predetermined range, particularly when the change of the intake pipe pressure is not sufficiently large as compared with the weight or margin imparted to a bit of a digital value obtained through analog-to-digital (A/D) conversion of the intake pipe pressure signal, i.e., when the change of the intake pipe pressure is less than the margin or threshold for a change of the last or lowest bit of the digital value. To cope with this problem (i.e., to detect a limited or fine change in the intake pipe pressure), the A/D converter for converting the signal indicative of the intake pipe pressure into a digital signal is required to have high resolution, which leads however to an expensive fault detecting apparatus.

SUMMARY OF THE INVENTION

In the light of the state of the art described above, it is an object of the present invention to provide an apparatus for detecting occurrence of a fault in an EGR control system which apparatus can be implemented inexpensively and which is capable of ensuring the fault detection with high accuracy and reliability even when a change in the pressure within an intake pipe of an internal combustion engine as brought about by operation of an EGR control valve is not sufficiently large as compared with a margin or threshold for changing the last or lowest bit of a digital value obtained through A/D conversion of an analog signal indicative of the intake pipe pressure.

In view of the above and other objects which will become apparent as description proceeds, there is provided according to an aspect of the present invention an apparatus for detecting a fault of an exhaust gas recirculation control system for an internal combustion engine, the apparatus comprising: an exhaust gas recirculation control valve disposed in an exhaust gas recirculation passage interconnecting an exhaust pipe and an intake pipe of the engine for opening or closing the exhaust gas recirculation passage; intake air amount control means for changing an amount of intake air supplied to the engine by a predetermined quantity, which is determined in dependence on an operation state of the engine, when the exhaust gas recirculation control valve is temporarily opened or closed; and fault determination means for determining whether a pressure within the intake pipe has changed after the opening or closing of the exhaust gas recirculation control valve, to thereby determine, on the basis of the result of the determination, whether the exhaust gas recirculation control system suffers from a fault.

According to another aspect of the present invention, there is provide an apparatus for detecting a fault of an exhaust gas recirculation control system for an internal combustion engine, the apparatus comprising: an exhaust gas recirculation control valve disposed in an exhaust gas recirculation passage interconnecting an exhaust pipe and an intake pipe of the engine for opening or closing the exhaust gas recirculation passage; intake air amount control means adapted to be actuated to decrease an amount of intake air supplied to the engine so as to decrease a pressure within the intake pipe by a quantity corresponding to a change in pressure within the intake pipe which is brought about by opening the exhaust gas recirculation control valve when the exhaust gas recirculation control system is in order, and fault determination means for making a determination that a fault has occurred in the exhaust gas recirculation control system when the pressure within the intake pipe has decreased upon opening of the exhaust gas recirculation control valve after actuation of the intake air amount control means.

According to a further aspect of the present invention, there is provided an apparatus for detecting a fault of an exhaust gas recirculation control system for an internal combustion engine, the apparatus comprising: an exhaust gas recirculation control valve disposed in an exhaust gas recirculation passage interconnecting an exhaust pipe and an intake pipe of the engine for opening or closing the exhaust gas recirculation passage; intake air amount control means adapted to be actuated to increase an amount of intake air supplied to the engine so as to increase a pressure within the intake pipe by a quantity corresponding to a change in pressure within the intake pipe which is brought about by closing the exhaust gas recirculation control valve when the exhaust gas recirculation control system is in order, and fault determination means for making a determination that a fault has occurred in the exhaust gas recirculation control system when the pressure within the intake pipe has increased upon closing of the exhaust gas recirculation control valve.

According to a still further aspect of the present invention, there is provided an apparatus for detecting a fault of an exhaust gas recirculation control system for an internal combustion engine, the apparatus comprising: an exhaust gas recirculation control valve disposed in an exhaust gas recirculation passage interconnecting an exhaust pipe and an intake pipe of the engine for opening or closing the exhaust gas recirculation passage; digital measuring means for measuring a pressure within the intake pipe of the engine to thereby generate a corresponding digital signal comprising a predetermined number of bits; intake air amount control means for changing an amount of intake air by a predetermined quantity, which is determined in dependence on an operation state of the engine, when the exhaust gas recirculation control valve is temporarily opened or closed in synchronism with a change in the last bit of a digital signal indicative of a measured intake pipe pressure obtained from the output of the digital measuring means; and fault determination means for making a determination as to whether a fault has occurred in the exhaust gas recirculation control system in dependence on whether the change in the intake pipe pressure generated upon opening or closing of the exhaust gas recirculation control valve and measured by the digital measuring means is greater than the least quantity for changing the last bit of the digital output signal of the digital measuring means.

According to a yet further aspect of the present invention, there is provided an apparatus for detecting a fault of an exhaust gas recirculation control system for an internal combustion engine, the apparatus comprising: an exhaust gas recirculation control valve disposed in an exhaust gas recirculation passage interconnecting an exhaust pipe and an intake pipe of the engine for opening or closing the exhaust gas recirculation passage; a switch adapted to assume an on state or off state in dependence on whether a pressure within the intake pipe of the engine is higher than a predetermined value; intake air amount control means for changing an amount of intake air by a predetermined quantity, which is determined in dependence on an operation state of the engine, when the exhaust gas recirculation control valve is temporarily opened or closed in synchronism with a change in the operating state of the switch; and fault determination means for making, on the basis of a change in the operating state of the switch after opening or closing of the exhaust gas recirculation control valve, a determination as to whether the exhaust gas recirculation control system suffers from a fault.

The above and other objects, features and attendant advantages of the present invention will more easily be understood by reading the following description of the preferred embodiments thereof taken, only by way of example, in conjunction with the drawings.

BRIEF DESCRIPTION OF THE DRAWINGS

FIG. 4 is a view graphically illustrating a correcting quantity in the processing shown in FIG. 3;

FIGS. 5(a)-(d) are a timing chart illustrating the operating timings of the fault detecting apparatus of FIG. 1 according to the one form of the invention;

FIG. 10 is a view graphically illustrating a correcting quantity in the processing shown in FIG. 9; and FIGS. 11(a)-(d) are a timing chart illustrating operation of the fault detecting apparatus of FIG. 7.

DESCRIPTION OF THE PREFERRED EMBODIMENTS

Now, the present invention will be described in detail in conjunction with preferred or exemplary embodiments thereof by reference to the drawings.

Embodiment 1

Figure 1:
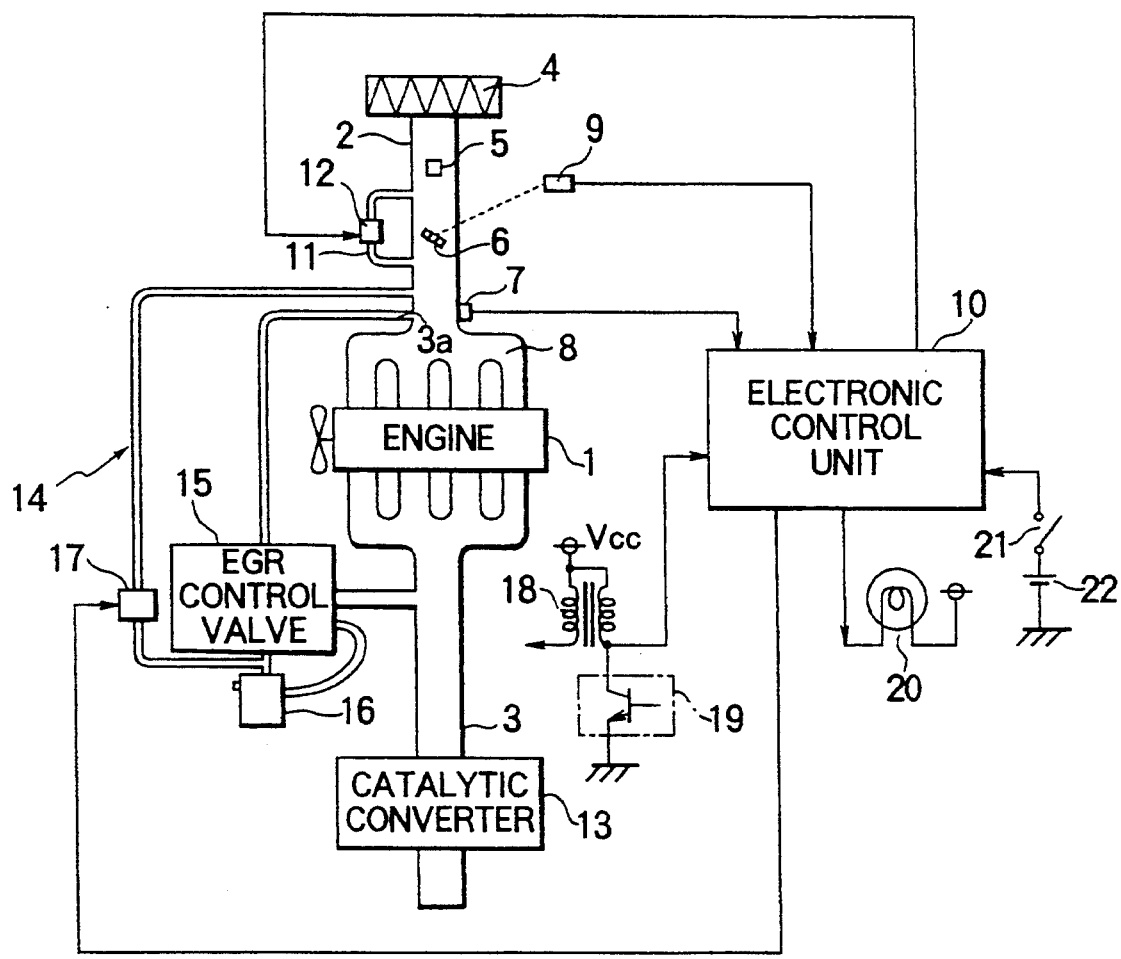
FIG. 1 shows the general arrangement an internal combustion engine with an EGR control system having a fault detecting apparatus according to a first embodiment of the present invention.

FIG. 1 shows the general arrangement of an internal combustion engine equipped with a fault detecting apparatus for diagnosing an exhaust gas recirculation control system according to a first embodiment of the invention. Referring to FIG. 1, a four-cycle spark-ignition type internal combustion engine adapted to be installed on an automobile is provided with an intake pipe 2 for supplying an air/fuel mixture to each cylinder of the engine and an exhaust pipe 3 for discharging an exhaust gas resulting from combustion of the air/fuel mixture. The intake pipe 2 is equipped with an air cleaner 4 for purifying the air taken in from the ambient atmosphere for combustion, a fuel injector 5 for injecting a fuel into the intake pipe 2, a throttle valve 6 for adjusting the amount of intake air flowing through the intake pipe 2, and an intake pipe pressure sensor 7 for sensing the pressure or intake vacuum in the intake pipe 2 downstream of the throttle valve 6, as viewed in FIG. 1 in this order in the direction from an inlet end of the intake pipe 2 toward the engine proper 1. The pressure sensor 7 is mounted at a position close to an intake manifold 8 of the engine 1 for detecting an absolute pressure PB within the intake pipe 2 to thereby output a signal indicative of the absolute pressure as detected.

Disposed in the vicinity of the throttle valve 6 is an idle switch 9 for detecting whether or not the throttle valve 6 is in the fully closed state. When the throttle valve 6 is in the fully closed position, the idle switch 9 is closed. The output of the idle switch 9 as well as that of the intake pipe pressure sensor 7 is supplied to an electronic control unit 10, which will be described hereinafter by reference to FIG. 2. Provided in the intake pipe 2 across the throttle valve 6 is a bypass passage 11 in which a bypass air flow control valve 12 is disposed for controlling the opened cross-sectional area of the passage 11. When the bypass air flow control valve 12 is opened, air is introduced into the engine 1 by bypassing the throttle valve 6. Thus, the bypass passage 11 and the bypass air flow control valve 12 constitute an intake air flow control means of the invention for varying the intake air flow by a predetermined amount which is determined in dependence on the operation or running state of the engine.

Disposed in the exhaust pipe 3 is a catalytic converter 13 which serves to eliminate noxious components from the exhaust gas resulting from the combustion of the air/fuel mixture within the engine 1.

An exhaust gas recirculation passage 14 is provided between the intake pipe 2 an the exhaust pipe 3 for interconnecting these pipes. More specifically, one end of the exhaust gas recirculation passage 14 is connected to the intake pipe 2 at a position close to and upstream of an exhaust gas recirculation negative pressure port 3a while the other end of the exhaust gas recirculation passage 14 is connected to the exhaust pipe 3 at a position close to an exhaust manifold of the engine. Disposed in the exhaust gas recirculation passage 14 are an exhaust gas recirculation (EGR) control valve 15, an exhaust gas pressure transducer 16 and an exhaust gas recirculation (EGR) solenoid valve 17. Through the exhaust gas recirculation passage 14, a part of the exhaust gas tapped from the exhaust pipe 3 is fed back to the intake pipe 2 at a position downstream of the bypass passage 11 to be recirculated through the engine 1. Introduced into an exhaust gas pressure transducer 16 is a negative pressure PEGR or the atmospheric pressure to the EGR control valve 15 in dependence on the levels of the pressures applied to the exhaust gas pressure transducer 16. The EGR control valve 15 and the exhaust gas pressure transducer 16 cooperate to constitute a so-called exhaust-gas control type EGR system.

When the exhaust gas pressure becomes higher than a predetermined value, the exhaust gas pressure transducer 16 introduces a negative pressure PEGR at the EGR negative pressure port 3a to the EGR control valve 15. When the EGR control valve 15 is opened to sufficiently lower the exhaust gas pressure (i.e., when the exhaust gas pressure becomes lower than a predetermined value), the exhaust gas pressure transducer 16 introduces the atmospheric pressure to the EGR control valve 15.

Upon application of the negative pressure PEGR, the EGR control valve 15 is opened to an extent corresponding to the magnitude of the negative pressure PEGR, whereby a part of the exhaust gas is recirculated through the engine 1. On the other hand, when the atmospheric pressure is introduced, the EGR control valve 15 is closed, stopping the exhaust gas recirculation.

Thus, when the negative pressure PEGR exceeds an EGR control reference negative pressure PCONT, the exhaust gas pressure transducer 16 and the EGR control valve 15 repeat the operations described above to thereby limit the peak of an exhaust gas recirculation (EGR) ratio KEGR (i.e., the ratio of the amount of recirculated exhaust gas to the amount of intake air).

When the exhaust gas recirculation solenoid valve 17 provided between the exhaust gas pressure transducer 16 and the EGR negative pressure port 3a is electrically energized, the pressure at the EGR negative pressure port 3a indicative of the pressure in the intake pipe or manifold 8 is introduced to the exhaust gas pressure transducer 16.

On the other hand, when the exhaust gas recirculation solenoid valve 17 is deenergized, the atmospheric pressure is introduced to the exhaust gas pressure transducer 16 independent of the pressure at the EGR negative pressure port 3a (i.e., the pressure in the intake manifold 8).

Provided in the vicinity of the engine proper 1 is an ignition coil 18 having a primary winding connected to a power supply $V_{cc}$ and a final stage transistor of an igniter 19 and a secondary winding connected to spark plugs (not shown) of the individual cylinders of the engine 1 for supplying a high voltage thereto. The ignition coil 18 is connected to the electronic control unit 10 as well.

The electronic control unit 10 has outputs connected to an alarm lamp 20 and a battery 22 via a key switch 21 and supplied with electric power from the battery 22 for processing the signals supplied from the idle switch 9 and the ignition coil 18 to thereby control the bypass air flow control valve 12, the exhaust gas recirculation solenoid valve 17 and the alarm lamp 20.

The alarm lamp 20 informs the operator of an occurrence of failure or fault in the EGR control system when the EGR control system (the EGR control valve 15, the exhaust gas pressure transducer 16 and/or the exhaust gas recirculation solenoid valve 17) does not operate normally for some cause.

Figure 2:
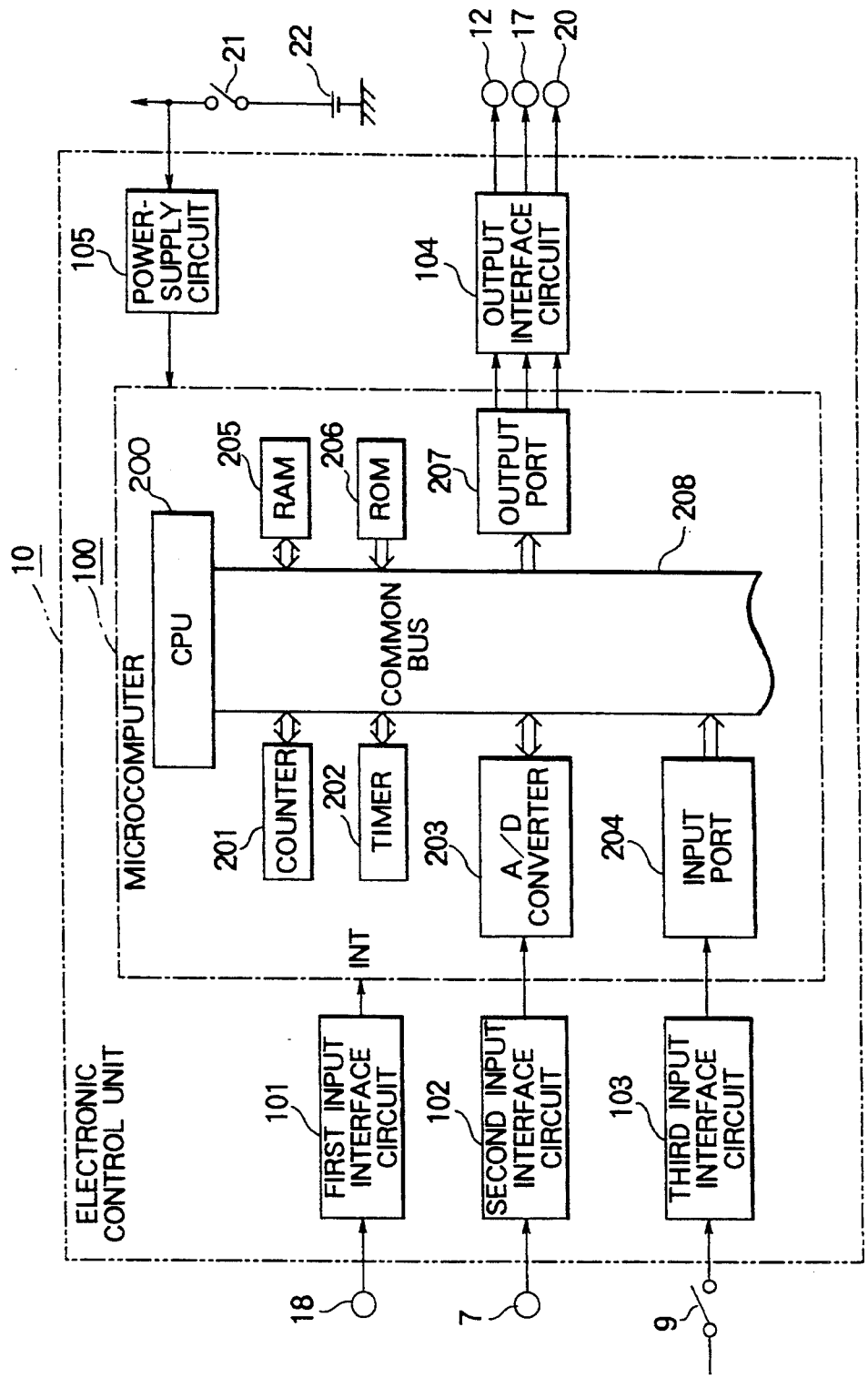
FIG. 2 is a block diagram showing the internal structure of an electronic control unit of FIG. 1.

FIG. 2 is a block diagram showing the internal structure of the ECU (Electronic Control Unit) 10 shown in FIG. 1. Referring to FIG. 2, the electronic control unit 10 includes a first input interface circuit 101 connected to the intake manifold pressure sensor 7, a second input interface circuit 102 connected to the pressure sensor, a third input interface circuit 103 connected to the idle switch 9, a microcomputer 100 connected to the interface circuits mentioned above, and an output interface circuit 104 connected to the electronic control unit 100.

Figure 3:
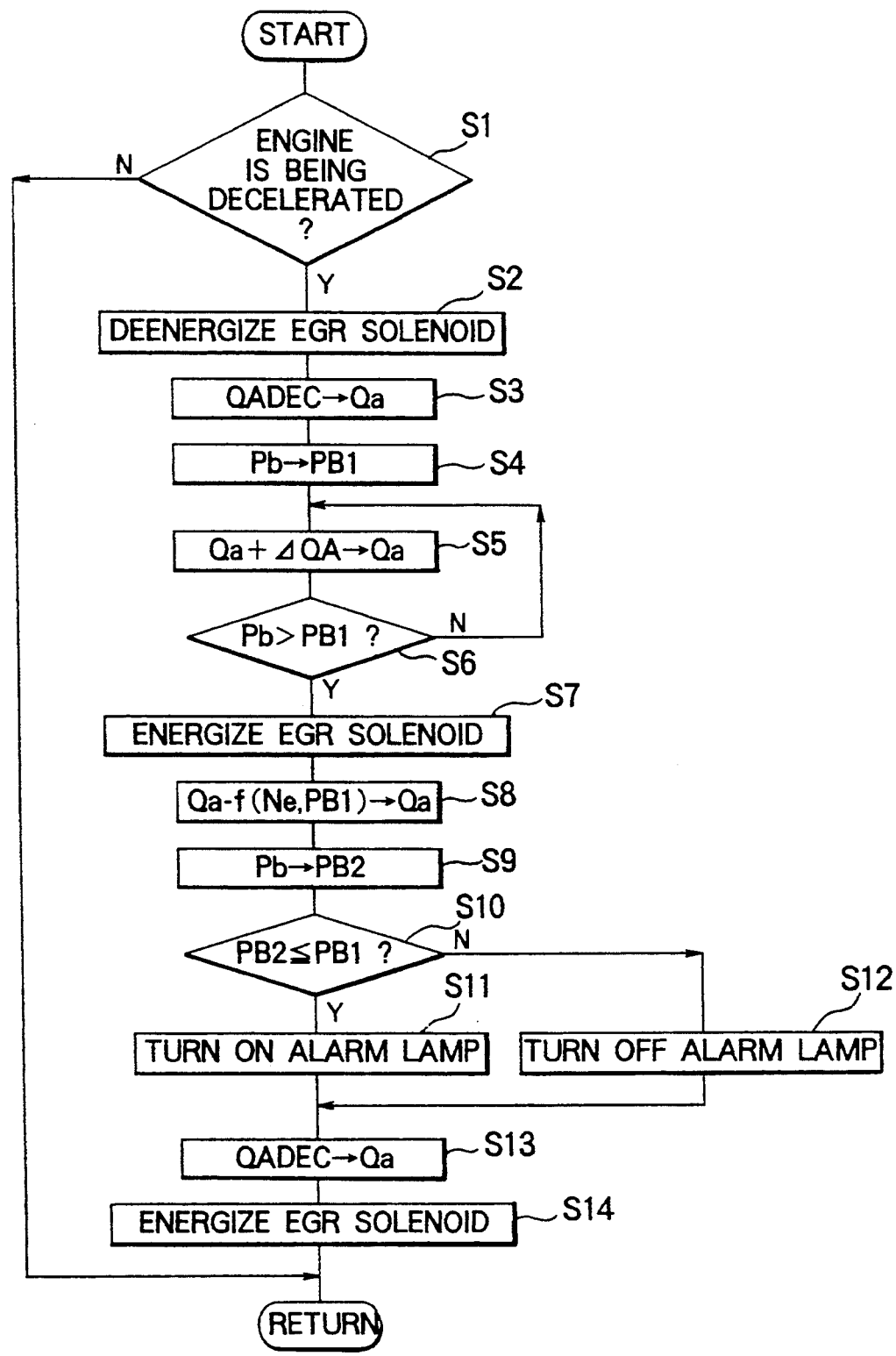
FIG. 3 is a flow chart illustrating one operational mode of the fault detecting apparatus of FIG. 1 according to one form of the invention.

The electronic control unit 100 includes a CPU (Central Processing Unit) 200 for performing various operations and processings, a counter 201 for measuring the engine rotation period or speed, a timer 202 for measuring a driving time, an analog-to-digital (A/D) converter 203 connected to the output of the second input interface 102, an input port 204 for transferring an output digital signal of the third interface circuit 103 to the CPU 200, a RAM (Random Access Memory) 205 used as a work memory, a ROM (Read-Only Memory) 206 for storing programs such as typified by a processing flow illustrated in FIG. 3 and an output port 207 for outputting command signals of the CPU 200, wherein the components mentioned above are interconnected via a common bus 208.

In the apparatus described above, the ignition signal derived from the primary winding of the ignition coil 18 is shaped by the first input interface circuit 101 into an interrupt command signal INT which is then inputted to the microcomputer 100.

Every time the interrupt command INT is received, the CPU 200 of the microcomputer 100 reads the count value from the counter 201 to arithmetically determine or calculate the rotation period (or speed) of the engine on the basis of a difference between the current count value and the preceding one of the counter 201.

Subsequently, the microcomputer 100 generates the engine rotation number (speed) signal indicative of the rotational speed or the number of revolutions per minute of the engine Ne.

The analog signal outputted from the pressure sensor 7 is supplied to the second input interface circuit 102 where the signal is amplified with noise components therein being eliminated. The output signal of the second input interface circuit 102 is supplied to the A/D converter 203 where it is converted into digital data of an intake pipe pressure value Pb indicative of the intake manifold pressure (i.e., the pressure within the intake pipe or manifold) PB when PB ∝ Pb.

An ON/OFF signal generated by the idle switch 9 is inputted to the third input interface circuit 103 where the signal is converted into a digital signal level to be inputted to the input port 204.

The output interface circuit 104 is adapted to output control signals for the bypass air flow control valve 12, the exhaust gas recirculation solenoid valve 17 and the alarm lamp 20 by amplifying the corresponding signals supplied from the output port 207.

A power supply circuit 105 responds to the turn-on of a key switch 21 to stabilize the output voltage of a battery 22 at a constant level. The stabilized power is supplied to the microcomputer 100 which then starts operations.

Next, description will turn to operations of the fault detecting apparatus illustrated in FIGS. 1 and 2 in accordance with the present invention while referring to FIGS. 3 to 5, wherein FIG. 3 is a flow chart illustrating one mode of operation of the apparatus according to one form of the invention, and FIG. 5 is a timing chart illustrating operating timings thereof.

Referring first to FIG. 3, it is determined in a step S1 whether the engine is being decelerated with the fuel injection being cut off (see FIG. 5 at (a)). More specifically, when it is detected that the throttle valve 6 is in the fully closed state (where the idle switch 9 is closed) and that the engine rotation speed Ne exceeds a predetermined level, it is determined in the step S1 that the engine 1 is being decelerated, and the fuel supply through the injector 5 is temporarily stopped. Subsequently, in a step S2 the EGR solenoid 17 is deenergized. If the engine is not in the deceleration mode, the processing shown in FIG. 3 comes to an end.

In the step S2, the exhaust gas recirculation solenoid valve 17 is deenergized (see FIG. 5 at (b)) to cause the EGR control valve 15 to be closed, and then a processing step S3 is executed. In the step S3, a predetermined value QADEC for deceleration is set to a control quantity Qa for the bypass air flow control valve 12 for controlling the intake air amount (see FIG. 5 at (c)). The electronic control unit 10 determines a time duration for driving the bypass air flow control valve 12 in correspondence to the control quantity Qa mentioned above in parallel with the processing shown in FIG. 3. The driving time thus determined is set at the timer 202 shown in FIG. 2. In this manner, the opened sectional area of the bypass air flow control valve 12 is controlled so as to conform with the control quantity Qa.

In the step S4, the intake pipe pressure value Pb currently sensed by the pressure sensor 7 (see FIG. 5 at (d)) is set or stored as a value PB1 in the RAM 205 of the electronic control unit 10, which is then followed by a step S5 where the control quantity Qa for the bypass air flow control valve 12 is increased or incremented by a predetermined minute quantity ΔQA. Subsequently, a step S6 is executed, where it is determined whether the intake pipe pressure value Pb is increased, due to incrementation of the control quantity Qa of the bypass air flow control valve 12 by ΔQA in the step S5, to exceed the value PB1 set in the step S4 by one bit. When the determination in the step S6 results in negation (NO), the step S5 is regained. If otherwise, a step S7 is executed. In this manner, through the execution of the steps S4 to S6, the control quantity Qa for the bypass air flow control valve 12 is set to a value at which the intake pipe pressure Pb (the value resulting from the A/D conversion of the intake pipe value) changes from the value PB1 to a value PB1+1 in the deenergized state of the exhaust gas recirculation solenoid value 17 (i.e., during non-recirculation of exhaust gas). Parenthetically, the change from PB1 to PB1+1 (increment of one bit) indicates a change in the value of the last or lowest bit of the digitized output signal from the A/D converter 203.

In the step S7, the exhaust gas recirculation solenoid valve 17 is energized to change over the EGR control valve 15 from its closed state into a state where it can be opened by the exhaust gas pressure transducer 16 when the exhaust gas pressure in the exhaust pipe 3 exceeds the predetermined value, and then the processing proceeds to a step S8. As a result of energization of the exhaust gas recirculation solenoid valve 17 in the step S7, the intake pipe pressure value Pb increases relative to the value PB1 when the EGR control valve 15 is actually operated to open by the transducer 16. In the step S8, a correcting quantity f(Ne, PB1) shown in FIG. 4 is determined on the basis of the current engine rotation speed Ne and the value PB1, and a new control quantity Qa is determined by subtracting the correcting quantity f(Ne, PB1) from the previous control quantity Qa for the bypass air flow control valve 12 in order to decrease or offset the increased value of intake pipe pressure Pb. Subsequently, the processing proceeds to a step S9 where the intake pipe pressure value Pb changed in the proceeding step S8 is set or stored as a value PB2, which is then followed by a step S10. At this juncture, it should be mentioned that the correcting quantity f(Ne, Pb1) is previously so set that the magnitude of decrease in the intake pipe pressure brought about by decreasing the control quantity Qa for the bypass air flow control valve 12 by the correcting quantity f(Ne, PB1) becomes equal to the magnitude of the change in the intake pipe pressure brought about by opening or closing the EGR control valve 15 when the EGR control system is in order or in the normal operating state. As a result, the value PB2 becomes equal to or smaller than the original value PB1 when the EGR control system suffers from a fault, while the value PB2 becomes greater than the value PB1 when the system is in the normal state.

In the step S10, it is determined whether the value PB2 is equal to or smaller than the value PB1. If the determination results in that PB2≦PB1, it is then determined that the EGR control system including the EGR control valve 15 suffers a fault, and an alarm lamp 20 is lit in a succeeding step S11. Accordingly, it can be said that the step S10 constitutes the fault determination means of the present invention as set forth in claims. On the other hand, if the determination in the step S10 shows that PB2>PB1, it is determined that the EGR control system is in the normal state. Accordingly, the alarm lamp 20 is turned off in a step S12. After execution of the steps S11 and S12, the processing proceeds to a step S13 where the control quantity for the bypass air flow control valve 12 is reset to the predetermined value QADEC for deceleration. Next, in a step S14, the exhaust gas recirculation solenoid valve 17 is deenergized, whereupon the processing shown in FIG. 3 comes to an end.

Figure 6:
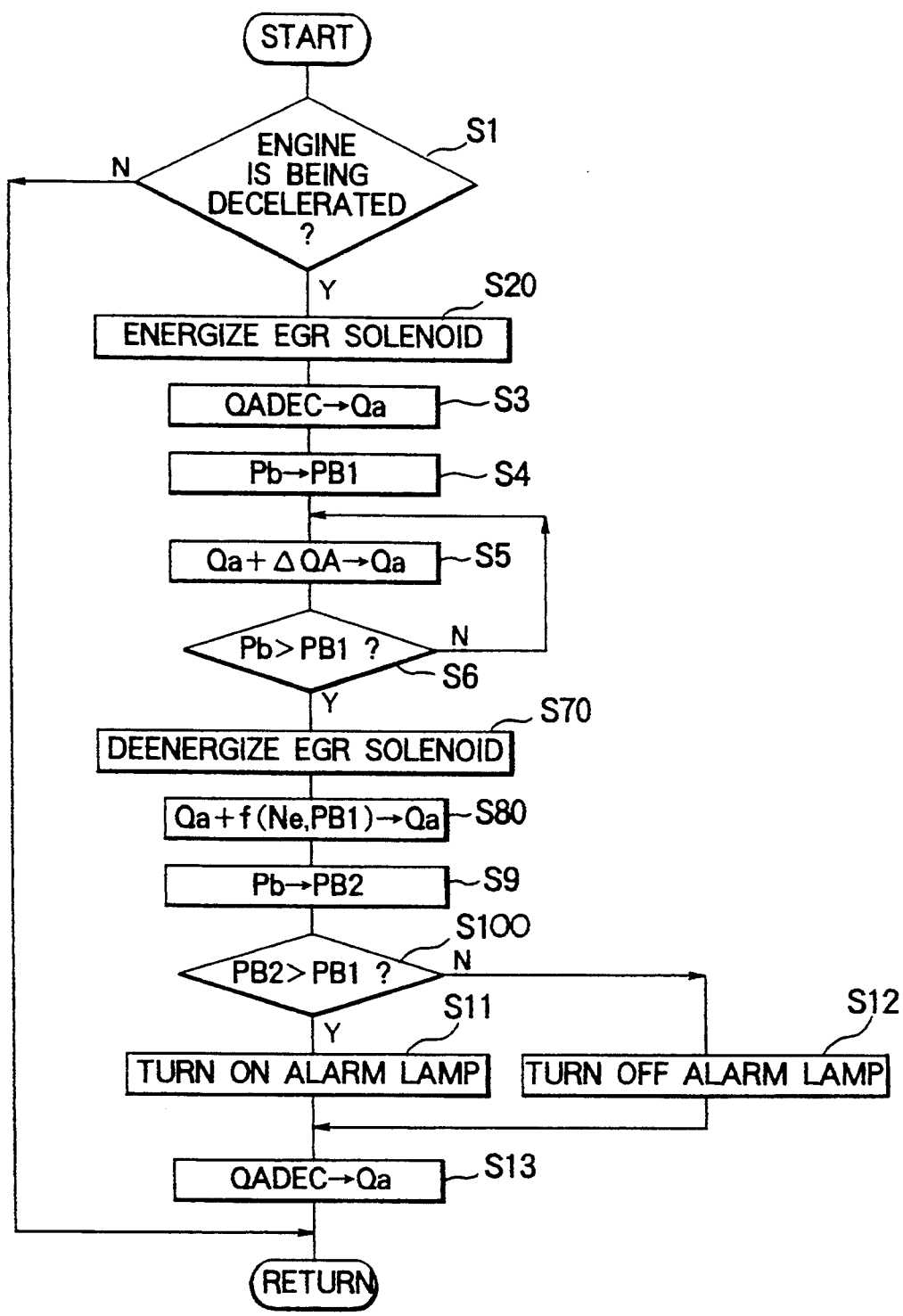
FIG. 6 is a flow chart for illustrating another operational mode of the fault detecting apparatus of FIG. 1 according to another form of the invention.

FIG. 6 illustrates another mode of operation of the fault detecting apparatus shown in FIGS. 1 and 2 in accordance with another form of the present invention.

In this mode of operation, a fault diagnosis of the EGR system is performed by detecting a change in the intake air pressure in the intake pipe 2 by means of the fault detecting apparatus at the time of stopping the operation of the EGR system during engine deceleration. This mode of operation is substantially similar to the above-mentioned mode of operation of the fault detecting apparatus, which has been described with reference to the flow chart of FIG. 3, except for the following steps S20, S70, S80 and S100 which replace steps S2, S7, S8 and S10, respectively, of FIG. 3. In this operational mode, the step S14 of FIG. 3 is omitted.

More specifically, as shown in the flow chart of FIG. 6, it is determined in a step S1 whether the engine is being decelerated with the fuel injection being cut off (see FIG. 5 at (a)), as in the step S1 of FIG. 3.

If the engine is not in the deceleration mode, the processing shown in FIG. 6 comes to an end.

If, however, it is determined in the step S1 that the engine is decelerating, then in the step S20, the exhaust gas recirculation solenoid valve 17 is energized to introduce the negative pressure in the intake pipe 2 into the exhaust gas pressure transducer 16 to thereby actuate or place the EGR control valve 15 into a condition in which the ERG control valve 15 can be opened under the control of the exhaust gas pressure transducer 16 when the exhaust gas pressure in the exhaust pipe 3 exceeds a predetermined value. In a step S3, a predetermined value QADEC for deceleration is set to a control quantity Qa for the bypass air flow control valve 12 for controlling the intake air amount (see FIG. 5 at (c)). Similar to the operational mode of FIG. 3, the electronic control unit 10 determines a time duration for driving the bypass air flow control valve 12 in correspondence to the control quantity Qa mentioned above in parallel with the processing shown in FIG. 6. The driving time thus determined is set at the timer 202 shown in FIG. 2. In this manner, the opened sectional area of the bypass air flow control valve 12 is controlled so as to conform with the control quantity Qa.

In a step S4, the intake pipe pressure value Pb currently sensed by the pressure sensor 7 (see FIG. 5 at (d)) is set or stored as a value PB1 in the RAM 205 of the electronic control unit 10, which is then followed by a step S5 where the control quantity Qa for the bypass air flow control valve 12 is increased or incremented by a predetermined minute quantity ΔQA. Subsequently, a step S6 is executed, where it is determined whether the intake pipe pressure value Pb is increased, due to incrementation of the control quantity Qa of the bypass air flow control valve 12 by ΔQA in the step S5, to exceed the value PB1 set in the step S4 by one bit. When the determination in the step S6 results in negation (NO, the step S5 is regained. If otherwise, a step S70 is executed. In this manner, through the execution of the steps S4 to S6, the control quantity Qa for the bypass air flow control valve 12 is set to a value at which the intake pipe pressure Pb (the value resulting from the A/D conversion of the intake pipe value) changes from the value PB1 to a value PB1+1 in the deenergized state of the exhaust gas recirculation solenoid valve 17 (i.e., during non-recirculation of exhaust gas).

Thus, after the intake pipe pressure value Pb becomes greater than the value PB1 in the step S6, then in the step S70, the exhaust gas recirculation solenoid valve 17 is deenergized to deactuate the exhaust gas pressure transducer 16 to thereby close the EGR control valve 15, thus stopping recirculation of exhaust gas.

Then in a step S80, a correcting quantity f(Ne, PB1) shown in FIG. 4 is determined on the basis of the current engine rotation speed Ne and the valve PB1, and a new control quantity Qa is determined by adding the correcting quantity f(Ne, PB1) to the previous control quantity Qa for the bypass air flow control valve 12 in order to increase or offset the decreased value of intake pipe pressure Pb.

Subsequently, in a step S9, the intake pipe pressure value Pb changed in the proceeding step S80 is set or stored as a value PB2, which is then followed by a step S100. In this connection, it should be noted that the correcting quantity f(Ne, PB1) is previously so set that the magnitude of increase in the intake pipe pressure brought about by increasing the control quantity Qa for the bypass air flow control valve 12 by the correcting quantity f(Ne, PB1) becomes equal to the magnitude of the change in the intake pipe pressure brought about by opening or closing the EGR control valve 15 when the EGR control system is in order or in the normal operating state. As a result, the value PB2 becomes greater than the original value PB1 when the EGR control system suffers from a fault, while the value PB2 becomes equal to or smaller than the value PB1 when the system is in the normal state.

In the step S100, it is determined whether the value PB2 is greater than the value PB1. If the determination results in that PB2>PB1, it is then determined that the EGR control system including the EGR control valve 15 suffers a fault, and an alarm lamp 20 is lit in a succeeding step S11.

On the other hand, if the determination in the step S100 shows that PB2≦PB1, it is determined that the EGR control system is in the normal state. Accordingly, the alarm lamp 20 is turned off in a step S12. After execution of the steps S11 and S12, the processing proceeds to a step S13 where the control quantity for the bypass air flow control valve 12 is reset to the predetermined value QADEC for deceleration, and the processing shown in FIG. 6 comes to an end.

In the above description, it has been assumed that the EGR control valve 15 is temporarily opened in the course of engine deceleration. However, it goes without saying that the EGR control valve 15 may temporarily be closed for fault detection when the engine load is stable as described, for example, in Japanese Unexamined Patent Application Publication No. 111274/1988 (JP-A-63-111274).

Embodiment 2

Figure 7:
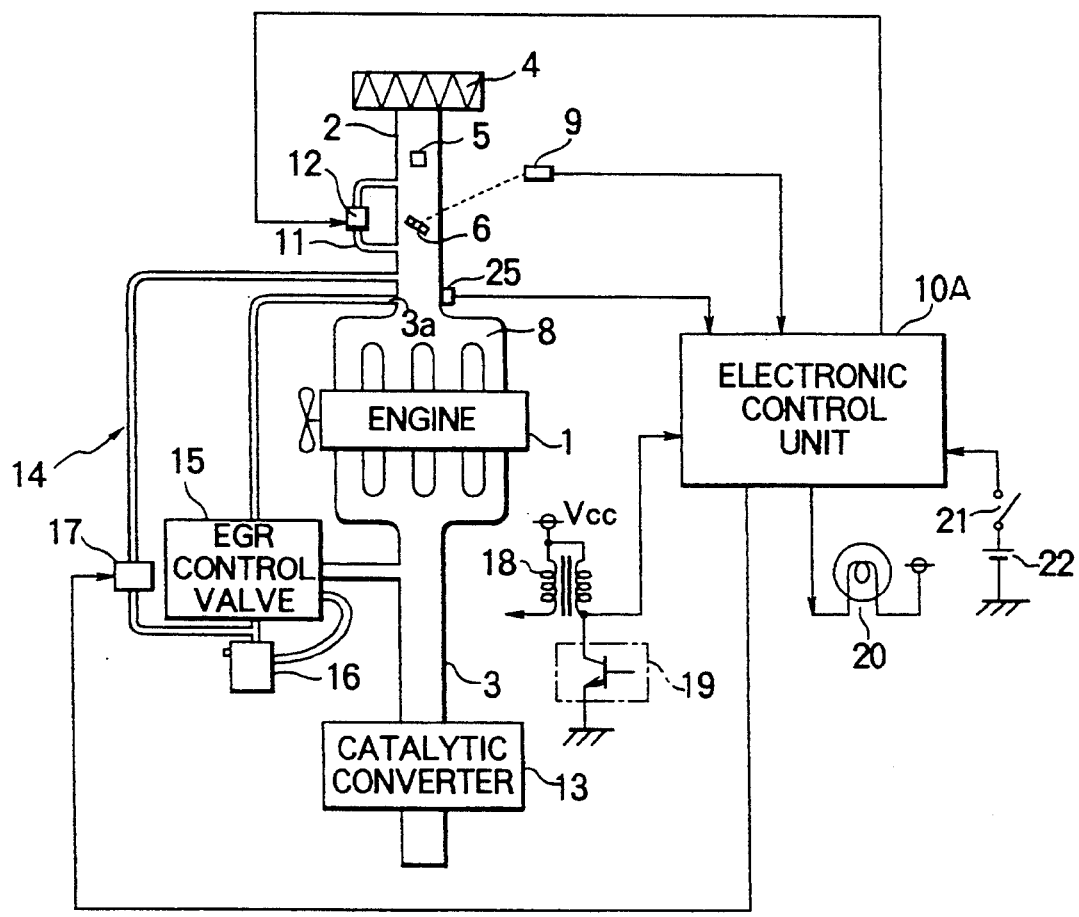
FIG. 7 is a schematic diagram showing the general arrangement of an internal combustion engine with an EGR control system having a fault detecting apparatus according to a second embodiment of the invention.

FIG. 7 is a schematic diagram showing the general arrangement of an internal combustion engine with an EGR control system having a fault detecting apparatus according to a second embodiment of the invention. In this figure, parts same as or equivalent to those shown in FIG. 1 are designated by like reference numerals, and repeated description thereof is omitted. The EGR control system according to the instant embodiment differs from that shown in FIG. 1 in that the pressure sensor 7 is replaced by a pressure switch 25 which is designed to be turned on when the intake pipe pressure of the pressure sensor 7 is higher than a predetermined pressure and turned off, if otherwise. The predetermined pressure (i.e., ON/OFF reference pressure) is set to an intake pipe pressure corresponding to a predetermined engine rotation number (e.g. 2000 rpm) in deceleration of the engine. The output signal of the pressure switch 25 is inputted to the electronic control unit 10A.

Figure 8:
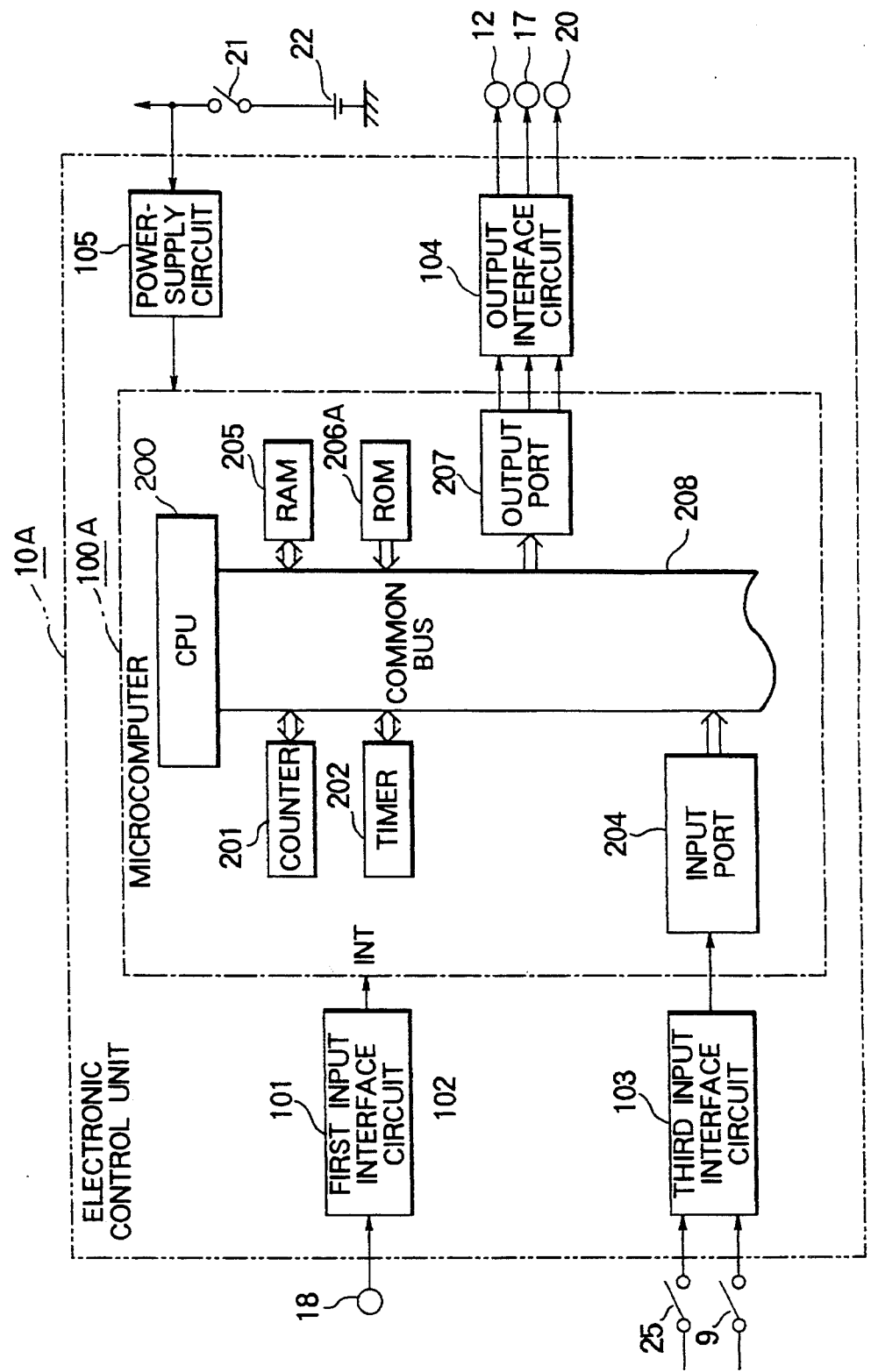
FIG. 8 is a block diagram showing the internal structure of an electronic control unit shown in FIG. 7.

FIG. 8 is a block diagram showing the internal structure of the electronic control unit 10A shown in FIG. 7. In FIG. 8, parts same as or equivalent to those shown in FIG. 2 are denoted by like reference numerals and repeated description thereof is omitted. The electronic control unit 10A shown in FIG. 8 differs from the electronic control unit 10 shown in FIG. 2 in that the second input interface circuit 102 and the A/D converter 203 are spaced and that the output signal of the pressure switch 25 is inputted to the third input interface circuit 103. Further, the ROM 206A stores programs typified by a processing flow illustrated in FIG. 9.

Figure 9:
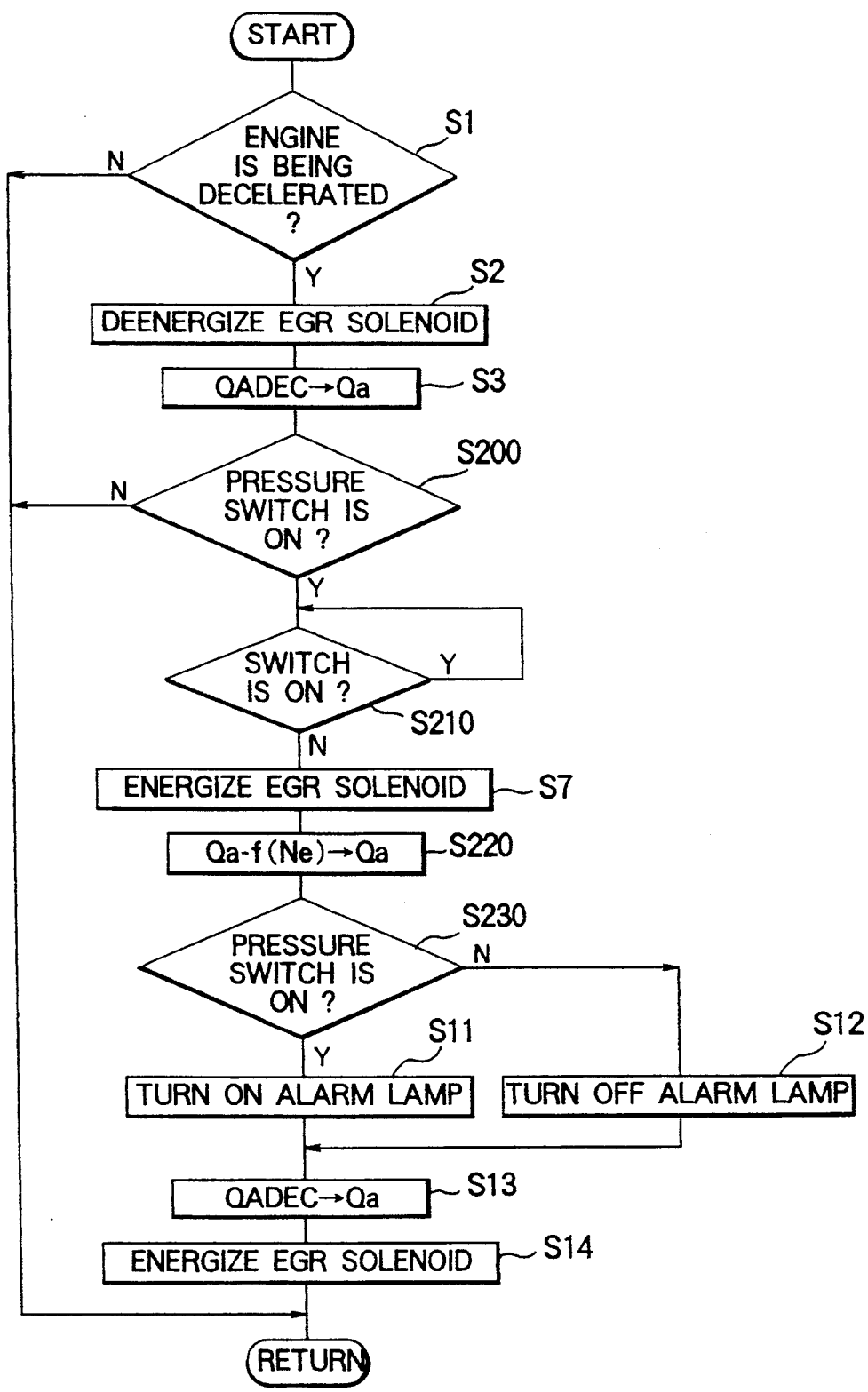
FIG. 9 is a flow chart illustrating operation of the fault detecting apparatus of FIG. 7.

Next, description will turn to operation of the system according to the second embodiment by reference to FIGS. 8 to 10, in which FIG. 9 is a flow chart illustrating operation of the system according to the second embodiment, and FIG. 11 is a timing chart therefor. In FIG. 9, the steps same or corresponding to those shown in FIG. 3 are designated by like reference numerals and repeated description thereof is omitted. In a step S1, it is first determined whether the engine 1 is being decelerated with the fuel injection being cut (also refer to FIG. 11(a)). When it is determined in the step S1 that the engine is decelerated, the processing proceeds to a step S2. If otherwise, the processing shown in FIG. 9 is terminated.

In the step S2, the exhaust gas recirculation solenoid valve 17 is deenergized to close the EGR control valve 15 (see FIG. 11, (b)), which is then followed by a step S3 where the control quantity Qa of the bypass air flow control valve 12 (FIG. 11 at (c)) is set to a predetermined value QADEC for deceleration, whereupon the processing proceeds to a step S200.

In the step S200, it is determined whether the pressure switch 25 is closed or opened. If it is opened (OFF), determination is made that fault detection is impossible and execution of the processing shown in FIG. 9 is completed. On the other hand, when the pressure switch 25 is closed (ON), the processing proceeds to a step S210 to make a determination again as to whether the pressure switch 25 is on or off. If the switch 25 is off, the step S210 is regained. If otherwise, the step S7 is executed. In general, when the engine rotation speed (rpm) immediately after the deceleration is higher than the rotation speed at which the pressure for ON/OFF determination of the pressure switch 25 becomes equal to the intake pipe pressure, the intake pipe pressure is lower than the ON/OFF determination pressure.

Accordingly, the processing proceeds to the step S210 where it is waited for that the intake pipe pressure increases beyond the ON/OFF determination pressure due to decrease in the rotation speed by the deceleration. When the intake pipe pressure increases beyond the ON/OFF determination pressure, the step S7 is executed.

In the step S7, the EGR solenoid 17 is electrically energized to thereby set the EGR control valve 15 to the state where the valve 15 can be opened, which is followed by a step S220 in which a correcting quantity f(Ne) is determined on the basis of the engine rotation number Ne, as illustrated in FIG. 10, to thereby set a new control quantity Qa by subtracting the correcting quantity f(Ne) from the current control quantity Qa of the bypass air control valve 12 for decreasing the increased intake pipe pressure level Pb. Subsequently, the processing proceeds to a step S230. The correcting quantity f(Ne) is previously so set that the magnitude of a reduction in the intake pipe pressure brought about by decreasing the control quantity Qa for the bypass control valve 12 by the correcting quantity f(Ne) upon deceleration becomes equal to the magnitude of a change in the intake pipe pressure which develops due to the opening or closing of the EGR control valve 15 when the EGR control system is in order or in the normally operating state. Consequently, after the step S220, the intake pipe pressure becomes lower than the ON/OFF determination pressure for the pressure switch 25 when the EGR control system suffers from a fault, while when the EGR control system is normal, the intake pipe pressure becomes higher than the ON/OFF determination pressure to thereby cause the pressure switch 25 to be opened.

In a step S230, determination is made whether the pressure switch 25 is closed (ON) or opened (OFF). When the switch 25 is closed, it is determined that the EGR system including the EGR control valve 15 suffers fault, whereon the processing proceeds to the step S11 to turn on the alarm lamp 20. Thus, the step S230 constitutes the fault determination means according to the invention. On the other hand, when the pressure switch 15 is opened, it is determined that the EGR control system is normal. Accordingly, the alarm lamp is turned off in the step S12. After execution of the steps S11 and S12, the step S13 is executed, whereby the control quantity Qa for the bypass air control valve 12 is reset to the predetermined value QADEC for deceleration. Subsequently, the EGR solenoid is deenergized. The processing shown in FIG. 9 then comes to an end.

Many modifications and variations of the present invention are possible in the light of the above techniques. It is therefore to be understood that within the scope of the appended claims, the invention may be practiced otherwise than as specifically described.

What is claimed is:

1. An apparatus for detecting a fault of an exhaust gas recirculation control system for an internal combustion engine, said apparatus comprising:
   an exhaust gas recirculation control valve disposed in an exhaust gas recirculation passage interconnecting an exhaust pipe and an intake pipe of said engine for opening or closing said exhaust gas recirculation passage;
   intake air amount control means for changing an amount of intake air supplied to said engine by a predetermined quantity, which is determined in dependence on an operation state of said engine, when said exhaust gas recirculation control valve is temporarily opened or closed; and fault determination means for determining whether a pressure within said intake pipe has changed after the opening or closing of said exhaust gas recirculation control valve, to thereby determine, on the basis of the result of said determination, whether said exhaust gas recirculation control system suffers from a fault.

2. An apparatus for detecting a fault of an exhaust gas recirculation control system for an internal combustion engine, said apparatus comprising:

an exhaust gas recirculation control valve disposed in an exhaust gas recirculation passage interconnecting an exhaust pipe and an intake pipe of said engine for opening or closing said exhaust gas recirculation passage;

intake air amount control means adapted to be actuated to decrease an amount of intake air supplied to said engine so as to decrease a pressure within said intake pipe by a quantity corresponding to a change in pressure within said intake pipe which is brought about by opening said exhaust gas recirculation control valve when said exhaust gas recirculation control system is in order; and fault determination means for making a determination that a fault has occurred in said exhaust gas recirculation control system when the pressure within said intake pipe has decreased upon opening of said exhaust gas recirculation control valve after actuation of said intake air amount control means.

3. An apparatus for detecting a fault of an exhaust gas recirculation control system for an internal combustion engine, said apparatus comprising:

an exhaust gas recirculation control valve disposed in an exhaust gas recirculation passage interconnecting an exhaust pipe and an intake pipe of said engine for opening or closing said exhaust gas recirculation passage;

intake air amount control means adapted to be actuated to increase an amount of intake air supplied to said engine so as to increase a pressure within said intake pipe by a quantity corresponding to a change in pressure within said intake pipe which is brought about by closing said exhaust gas recirculation control valve when said exhaust gas recirculation control system is in order; and fault determination means for making a determination that a fault has occurred in said exhaust gas recirculation control system when the pressure within said intake pipe has increased upon closing of said exhaust gas recirculation control valve.

4. An apparatus for detecting a fault of an exhaust gas recirculation control system for an internal combustion engine, said apparatus comprising:

an exhaust gas recirculation control valve disposed in an exhaust gas recirculation passage interconnecting an exhaust pipe and an intake pipe of said engine for opening or closing said exhaust gas recirculation passage;

digital measuring means for measuring a pressure within said intake pipe of said engine to thereby generate a corresponding digital signal comprising a predetermined number of bits;

intake air amount control means for changing an amount of intake air by a predetermined quantity, which is determined in dependence on an operation state of said engine, when said exhaust gas recirculation control valve is temporarily opened or closed in synchronism with a change in the last bit of a digital signal indicative of a measured intake pipe pressure obtained from the output of said digital measuring means; and fault determination means for making a determination as to whether a fault has occurred in said exhaust gas recirculation control system in dependence on whether the change in the intake pipe pressure generated upon opening or closing of said exhaust gas recirculation control valve and measured by said digital measuring means is greater than the least quantity for changing the last bit of the digital output signal of said digital measuring means.

5. An apparatus for detecting a fault of an exhaust gas recirculation control system for an internal combustion engine, said apparatus comprising:

an exhaust gas recirculation control valve disposed in an exhaust gas recirculation passage interconnecting an exhaust pipe and an intake pipe of said engine for opening or closing said exhaust gas recirculation passage;

a switch adapted to assume an on state or off state in dependence on whether a pressure within said intake pipe of said engine is higher than a predetermined value;

intake air amount control means for changing an amount of intake air by a predetermined quantity, which is determined in dependence on an operation state of said engine, when said exhaust gas recirculation control valve is temporarily opened or closed in synchronism with a change in the operating state of said switch; and fault determination means for making, on the basis of a change in the operating state of said switch after opening or closing of said exhaust gas recirculation control valve, a determination as to whether said exhaust gas recirculation control system suffers from a fault.

* * * * *